(No Model.)
E. R. HYDE.
WEAR COMPENSATING DEVICE.
No. 395,275. Patented Dec. 25, 1888.
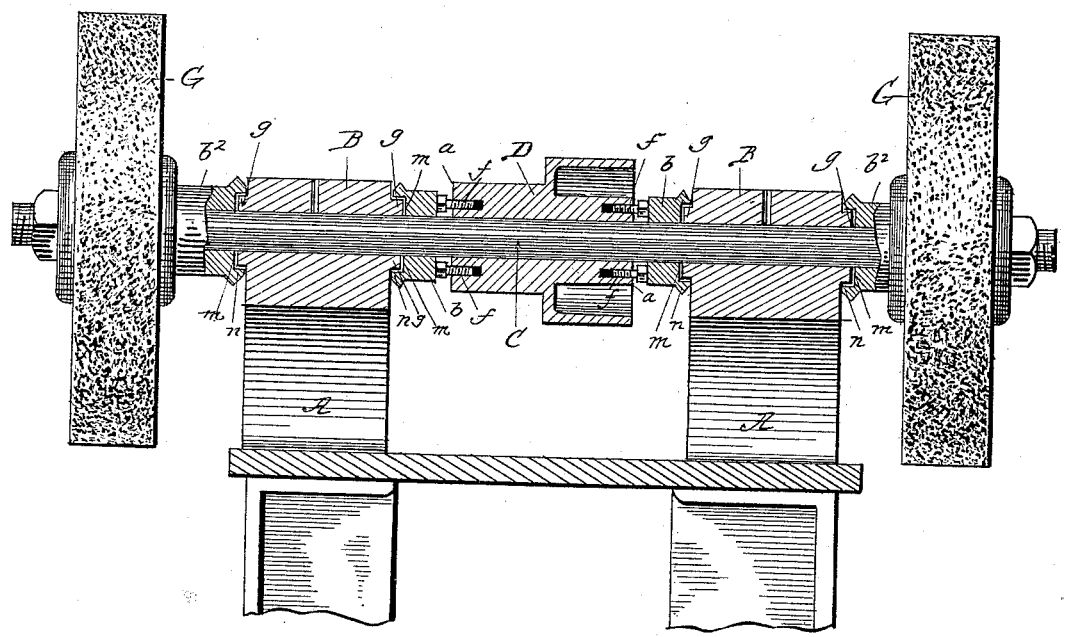
Witnesses
Wm. T. Bellows
G. M. Chamberlain
Inventor,
Edwin R. Hyde,
By his Attorneys

UNITED STATES PATENT OFFICE.

ELWIN R. HYDE, OF SPRINGFIELD, MASSACHUSETTS, ASSIGNOR TO THE SPRINGFIELD GLUE AND EMERY WHEEL COMPANY, OF SAME PLACE.

WEAR-COMPENSATING DEVICE.

SPECIFICATION forming part of Letters Patent No. 395,275, dated December 25, 1888.

Application filed March 23, 1888. Serial No. 268,227. (No model.)

*To all whom it may concern:*

Be it known that I, ELWIN R. HYDE, a citizen of the United States of America, residing at Springfield, in the county of Hampden and State of Massachusetts, have invented new and useful Improvements in Wear-Compensating Devices for Grinding and other Machines, of which the following is a specification.

This invention relates to improvements in devices for taking up the wear between the ends of journal-bearings and the ends or hubs of a pulley or pulleys or other wheel on a shaft or arbor supported in said bearings, whereby there will be no endwise movement of the said pulley or wheel or of the shaft to which the same is secured; and it consists in the construction and combination of parts, all substantially as will hereinafter more fully appear.

In the accompanying drawing, the present invention is illustrated as employed in connection with a knife-grinding machine, the figure being a partial elevation and a longitudinal vertical section thereof.

In the drawing, A A represent standards carrying the journal-boxes B B, in which bears the arbor or shaft C, having thereon between said bearing-boxes the hubbed speed-pulley D, and at each end carrying an emery or other suitable grinding-wheel, G, as shown. Between said journal-bearings B B and the ends of the hubs $a$ of the pulley are interposed loose collars $b$ $b$. Headed screws $f$ $f$ are entered longitudinally into screw-threaded sockets in the ends of the hub of the pulley, and in a manner to be turned outwardly therefrom to bear against the said collars $b$ $b$ to force them outwardly and maintain them against the ends of the said journal-bearings.

On the wearing away of the ends of the screws, the journal-bearings, or the collars, to such an extent that the arbor would have any endwise play in its bearings, the said screws are turned outwardly to force the collars $b$ $b$ closely against the journal-bearings.

The ends of each of the journal-boxes B B are provided with annular ribs or flanges $g$ $g$, and the collars $b$ $b$, as also the collars $b^2$ $b^2$, outside of and between said journal-bearings and the grinding-wheels, have within their ends recesses or depressions $m$ $m$, surrounded by the annular walls $n$, which annular walls overlie the said annular flanges of the journal-bearings, thereby preventing the entrance of dirt, &c., into the said bearings.

What I claim as my invention is—

1. The combination, with the journal-bearings B B, of an arbor having the pulley provided with the screws $f$, and the loose collars $b$ $b$ between said screws and journal-bearings, substantially as described.

2. The combination, with the journal-bearings B B, having on their ends the annular flanges $g$ $g$, of the arbor having thereon between said bearings the pulley provided with the screws $f$, the loose collars $b$ $b$ between said screws and the inner ends of said journal-bearings, the wheels on the end portions of said arbor, and the collars $b^2$ $b^2$ between said wheels and the outer end of said journal-bearings, the said collars $b$ $b$ $b^2$ $b^2$ being provided with the depressions $m$, all substantially as and for the purpose described.

ELWIN R. HYDE.

Witnesses:
H. A. CHAPIN,
G. M. CHAMBERLAIN.